United States Patent
Abe et al.

(10) Patent No.: US 8,720,406 B2
(45) Date of Patent: May 13, 2014

(54) ENGINE WITH VIBRATION SUPPRESSION STRUCTURE

(75) Inventors: Naoyuki Abe, Hiroshima (JP); Kazuhiro Tomizawa, Hiroshima (JP); Yasushi Nakahara, Higashihiroshima (JP); Kiyonori Nagato, Otake (JP); Yasuhiro Sudou, Iwakuni (JP); Hiroshi Hosokawa, Hiroshima (JP); Yuma Miyauchi, Hiroshima (JP); Jun Nishikawa, Hiroshima (JP); Osamu Torobu, Hiroshima (JP); Hiroyuki Abe, Hiroshima (JP); Kazuhiro Matsuoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 285 days.

(21) Appl. No.: 12/917,349

(22) Filed: Nov. 1, 2010

(65) Prior Publication Data
US 2011/0114056 A1    May 19, 2011

(30) Foreign Application Priority Data

Nov. 19, 2009    (JP) ................. 2009-264097

(51) Int. Cl.
| | |
|---|---|
| *F02B 75/22* | (2006.01) |
| *F02F 7/00* | (2006.01) |
| *F02B 67/00* | (2006.01) |
| *F02F 11/00* | (2006.01) |

(52) U.S. Cl.
USPC ............. 123/195 R; 123/195 S; 123/195 A; 277/594; 277/595

(58) Field of Classification Search
USPC ........ 123/195.1, 195.2, 195 R, 195 S, 195 A; 277/594, 595
See application file for complete search history.

(56) References Cited

U.S. PATENT DOCUMENTS

| | | | | |
|---|---|---|---|---|
| 2,902,021 | A | * | 9/1959 | Leach ................. 123/195 R |
| 4,291,650 | A | * | 9/1981 | Formia et al. .......... 123/41.82 A |

(Continued)

FOREIGN PATENT DOCUMENTS

JP    2009-156061 A    7/2009

OTHER PUBLICATIONS

Yamahaoutboards.com, Midrange Fuel Economy, Nov. 7, 2012, yamahaoutboards.com, file named Fuel Injector Yamaha 1, picture.*

(Continued)

*Primary Examiner* — Lindsay Low
*Assistant Examiner* — Charles Brauch
(74) *Attorney, Agent, or Firm* — Alleman Hall McCoy Russell & Tuttle LLP

(57) ABSTRACT

There is provided, in one aspect of the present description, an engine. In one example, the engine comprises a cylinder block, a cylinder head, a sheet metal gasket interposed between the block and the head, a first projection projecting outwardly and laterally from a side portion of the block, and a second projection projecting outwardly and laterally from a side portion of the head, the first projection and the second projection facing each other along a coupling surface between the block and the head. The engine further comprises an extension extending from a main body of the sheet metal gasket and located between the first projection and the second projection, and a resilient portion which is provided in the extension, formed resiliently in a direction perpendicular to the coupling surface, and compressed between the first projection and the second projection when the head is fastened on the block.

12 Claims, 9 Drawing Sheets

(56) References Cited

U.S. PATENT DOCUMENTS

| | | | | |
|---|---|---|---|---|
| 4,712,517 | A * | 12/1987 | Anno et al. | 123/41.74 |
| 4,750,749 | A * | 6/1988 | Nicholson | 277/595 |
| 5,427,388 | A * | 6/1995 | Ueta | 277/595 |
| 5,580,065 | A * | 12/1996 | Ueta | 277/591 |
| 5,664,790 | A * | 9/1997 | Tanaka et al. | 277/595 |
| 5,695,200 | A * | 12/1997 | Diez et al. | 277/593 |
| 5,791,659 | A * | 8/1998 | Takada et al. | 277/593 |
| 5,868,107 | A * | 2/1999 | Betsch et al. | 123/41.82 R |
| 5,876,038 | A * | 3/1999 | Bohm et al. | 277/593 |
| 6,336,639 | B1 * | 1/2002 | Ishida et al. | 277/594 |
| 6,431,554 | B1 * | 8/2002 | Miyamoto et al. | 277/593 |
| 7,739,995 | B2 * | 6/2010 | Yasuda | 123/195 R |
| 2008/0023923 | A1 * | 1/2008 | Kameyama et al. | 277/595 |
| 2008/0203677 | A1 * | 8/2008 | Yasuda | 277/595 |
| 2008/0237998 | A1 * | 10/2008 | Chen et al. | 277/595 |
| 2008/0265524 | A1 * | 10/2008 | Mori | 277/595 |
| 2009/0066036 | A1 * | 3/2009 | Schmitz | 277/595 |
| 2009/0072493 | A1 * | 3/2009 | Duckek et al. | 277/593 |
| 2009/0189359 | A1 * | 7/2009 | Yoshijima et al. | 277/591 |

OTHER PUBLICATIONS

Yamahaoutboards.com, High Power Benefits, Nov. 7, 2012, yamahaoutboards.com, file named Fuel Injector Yamaha 2, p. 4 of 14 second picture.*

Yamahaoutboards.com, Midrange Smooth Operation, Nov. 7, 2012, yamahaoutboards.com, file named Fuel Injector Yamaha 3, picture.*

Flying Fish Carburetors, Marine Fuel Injection, 2005, Cyberhome Florida, p. 1.*

* cited by examiner

ENGINE WITH VIBRATION SUPPRESSION STRUCTURE

BACKGROUND

The present invention relates to an engine, and more particularly to an engine with a vibration suppression structure, comprising a cylinder block, cylinder head and a sheet metal gasket interposed between the cylinder block and the cylinder head.

In general, a power unit for a vehicle comprises an engine and a transmission. The transmission is coupled to an end surface of the engine where an output shaft protrudes therefrom (for the purpose of this specification, the side of the end surface is referred to as "rear side" and the opposite side is referred to as "front side" when the power unit is mounted on the vehicle).

Particularly, a housing that stores a clutch or a torque converter for the transmission is coupled to the rear end surface of the cylinder block, by use of a plurality of bolts that fasten a flange portion formed at the periphery of the front end of the housing to the rear end surface of the cylinder block.

In order to increase the coupling rigidity between the engine and the transmission for more bending stiffness of the entire power unit, it is preferred that a cylinder block of an engine and a housing of a transmission be coupled together via a large area. For this purpose, as shown in FIG. 9, a flange portion B1 is formed at the rear end of a cylinder block B of an engine A so as to reach the top portion of the cylinder block B, or a coupling surface between the cylinder block B and a cylinder head C. The flange portion B1 is brought into contact with a flange portion E1 of a housing E of a transmission D, and fastened thereto by bolts F.

For reinforcing the top portion of the flange B1 of the cylinder block B, a plate-shaped rib B2 may be formed which forwardly extends from behind the top portion of the flange B1 along the top end surface of the cylinder block B. In this case, the rib B2 projects outwardly and laterally with respect to the engine A from the rear top surface of the cylinder block B.

In the meantime, the side surface of the cylinder block B is constituted by a relatively thin wall, which tends to cause so-called membrane oscillation. To suppress the oscillation and the resultant noise, a rib may be formed on a side wall of a cylinder block as disclosed in Japanese Patent Application Publication 2009-156061. As mentioned above, however, the plate-shaped rib B2 projecting outwardly from the top end surface of the cylinder block B may unfavorably cause vibration which leads to another problem.

In more detail, when in the cylinder head C, fuel injectors are arranged immediately above the rib B2, the fuel injectors G cause so called ticking vibration resulting from the open/close motion of valves thereof, which is in turn transmitted to the rib B2 of the cylinder block B, possibly causing a resonance of the rib B2. This vibration of the rib B2 or membrane oscillation of the side wall of the cylinder block B caused by transmitted vibration of the rib B2 may cause the abovementioned problem.

In view of the abovementioned problem, it is an object of the present invention to provide an engine having a structure for suppressing a vibration of a projection laterally projecting from the side of a top portion of a cylinder head of an engine (such as a reinforcing rib for a flange used to couple the cylinder block with a transmission) and a noise caused by the vibration, while minimizing an increase in engine weight by use of a sheet metal gasket as an exiting part interposed between projections of cylinder block and a cylinder head.

SUMMARY

In accordance with an aspect of the present invention, there is provided an engine comprising a cylinder block that is formed with a plurality of cylinder bores in a line that define a part of combustion chambers, a cylinder head mounted on a top surface of the cylinder block, and a sheet metal gasket interposed between the cylinder block and the cylinder head.

The engine further comprises a first projection projecting outwardly and laterally from the side portion of the cylinder block, a second projection projecting outwardly and laterally from the side portion of the cylinder head, the first projection and the second projection facing each other along a coupling surface between the cylinder block and the cylinder head, an extension extending from the main body of the sheet metal gasket and located between the first projection and the second projection, and a resilient portion which is provided in the extension and formed resiliently in a direction perpendicular to the coupling surface, compressed between the first projection and the second projection when the cylinder head is fastened on the block.

According to this aspect of the present invention, by providing the resilient portion in the extension of the sheet metal gasket between the first and second projection, vibration generated in the cylinder block can be absorbed in the resilient portion without reaching the cylinder head. And, vibration generated in the cylinder head can be absorbed without reaching the cylinder block as well. Therefore, the vibration can be suppressed from being transmitted between the cylinder block and the cylinder head.

If fuel injectors are provided on a side surface of the cylinder head to inject fuel directly into the combustion chambers, ticking vibration caused by the fuel injectors is prevented from being transmitted from the second projection to the first projection. Accordingly, even with fuel injectors as a vibration source, the vibration of the first projection and noise caused by membrane oscillation of the side surface of the cylinder block is effectively suppressed.

Preferably, the engine may comprise a flange provided on a rear end surface of the cylinder block so as to reach the coupling surface between the cylinder block and the cylinder head, a reinforcing rib may be provided which extends forwardly from behind a top portion of the flange, an attachment boss may be provided on a rear side surface of the cylinder head for attaching the fuel injector that injects fuel into the rearmost combustion chamber, the reinforcing rib may constitute the first projection, and a bottom portion of the boss may constitute the second projection.

The first projection and the second projection are formed by the parts serving other purposes, thereby eliminating the need to newly provide the projections. This accordingly avoids an increase in weight of the cylinder block and the cylinder head while achieving vibration and noise reduction.

If a reference portion used in the processing of the cylinder head is provided which laterally projects from the side of the engine, the reinforcing rib may constitute the first projection and the reference portion may constitute the second projection, instead of the attachment portion.

Also in this case, similarly, the first projection and the second projection are formed by the parts serving other purposes, thereby eliminating the need to newly provide the projections. This accordingly avoids an increase in weight of the cylinder block and the cylinder head while achieving vibration and noise reduction.

Preferably, the resilient portion may be a half-bead portion formed in the extension.

The resilient portion is produced similarly to beads formed in the gasket to seal the combustion chamber or a water jacket. Accordingly, there is no need for any special process for forming the resilient portion, thereby reducing the production cost of the gasket.

DESCRIPTION OF EMBODIMENT

Hereinafter, an embodiment of a vibration suppression structure of an engine according to the invention is described.

Figure 1:
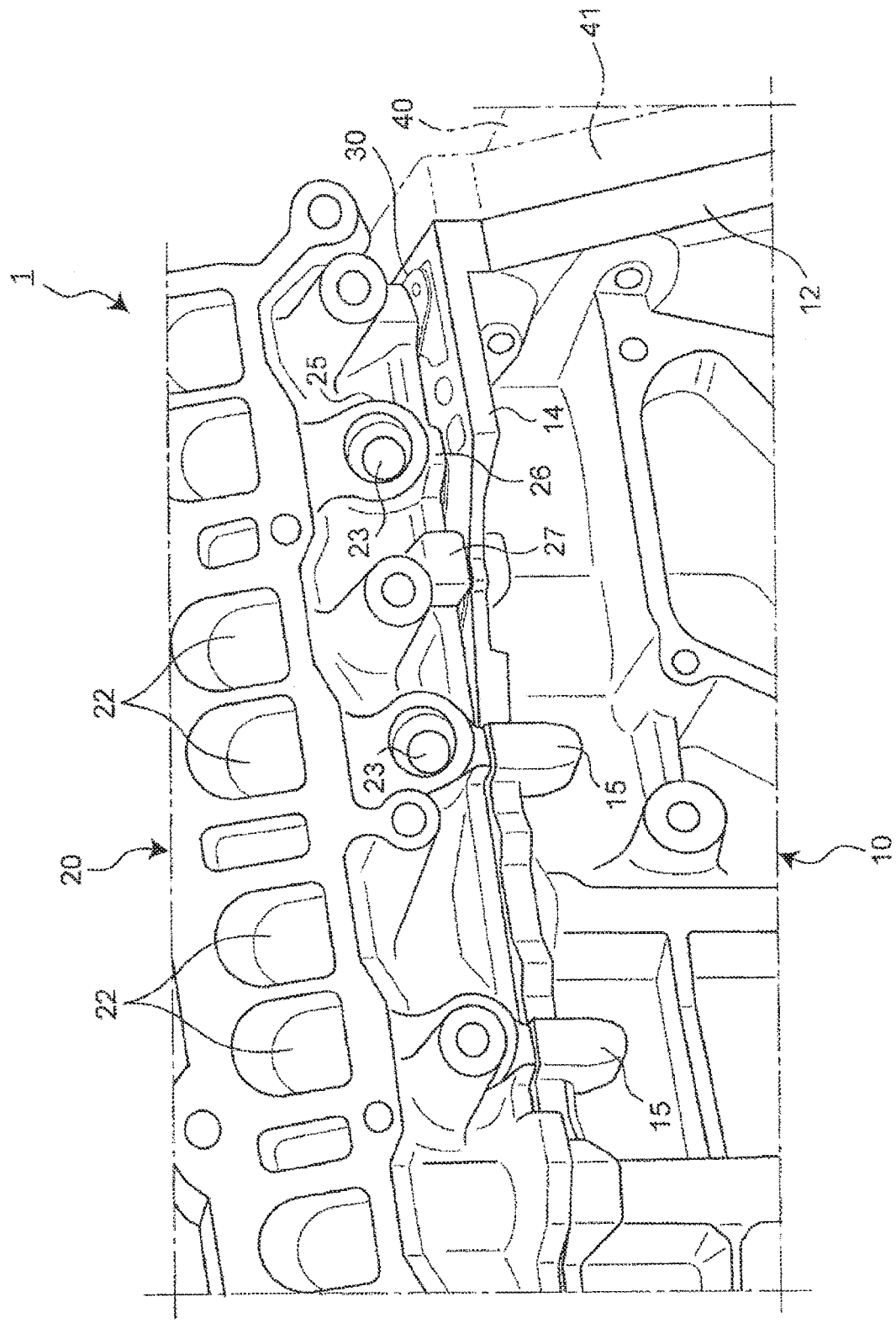
FIG. 1 is a perspective view of a rear part of an engine according to an embodiment of the invention.
Figure 2:
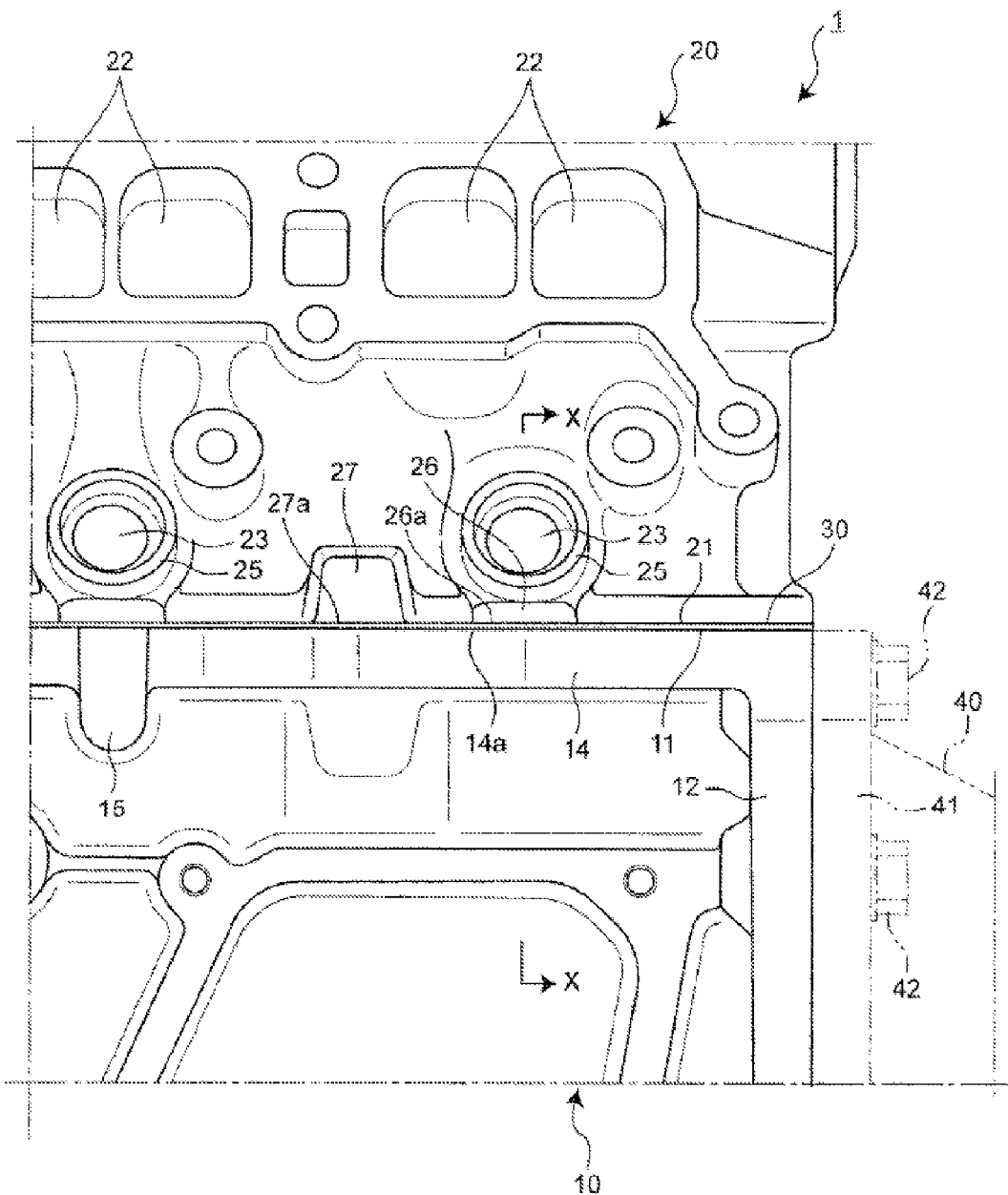
FIG. 2 is a side view of the rear of the engine.

FIGS. 1 and 2 show a coupling part of a cylinder block 10 and a cylinder head 20 in a rear part of an engine 1 according to this embodiment. The cylinder block 10 and the cylinder head 20 are coupled to each other so as to have a sheet metal gasket 30 between coupling surfaces 11 and 21 of both, respectively, with head bolts (not illustrated).

A flange portion 12 that reaches the coupling surface 11 coupling to the cylinder head 20 is provided in a rear end face of the cylinder block 10 (the coupling surface 11 corresponds to the uppermost part of the cylinder block 10). A flange portion 41 at the front end of a housing 40 that accommodates a clutch (or a torque converter) of a transmission contacts the flange portion 12. These flange portions 12 and 41 are fastened with bolts 42 at two or more locations around the housing including the uppermost part. Thereby, the cylinder block 10 of the engine 1 and the housing 40 of the transmission are coupled to each other.

For every cylinder, two intake ports 22 open in a side face of the cylinder head 20 shown in FIGS. 1 and 2, and mounting holes 23 for fuel injection valves are formed also in the cylinder head 20. In addition, although not being illustrated, two exhaust ports open in the other side face on the opposite side of the cylinder head 20 for every cylinder.

Figure 3:
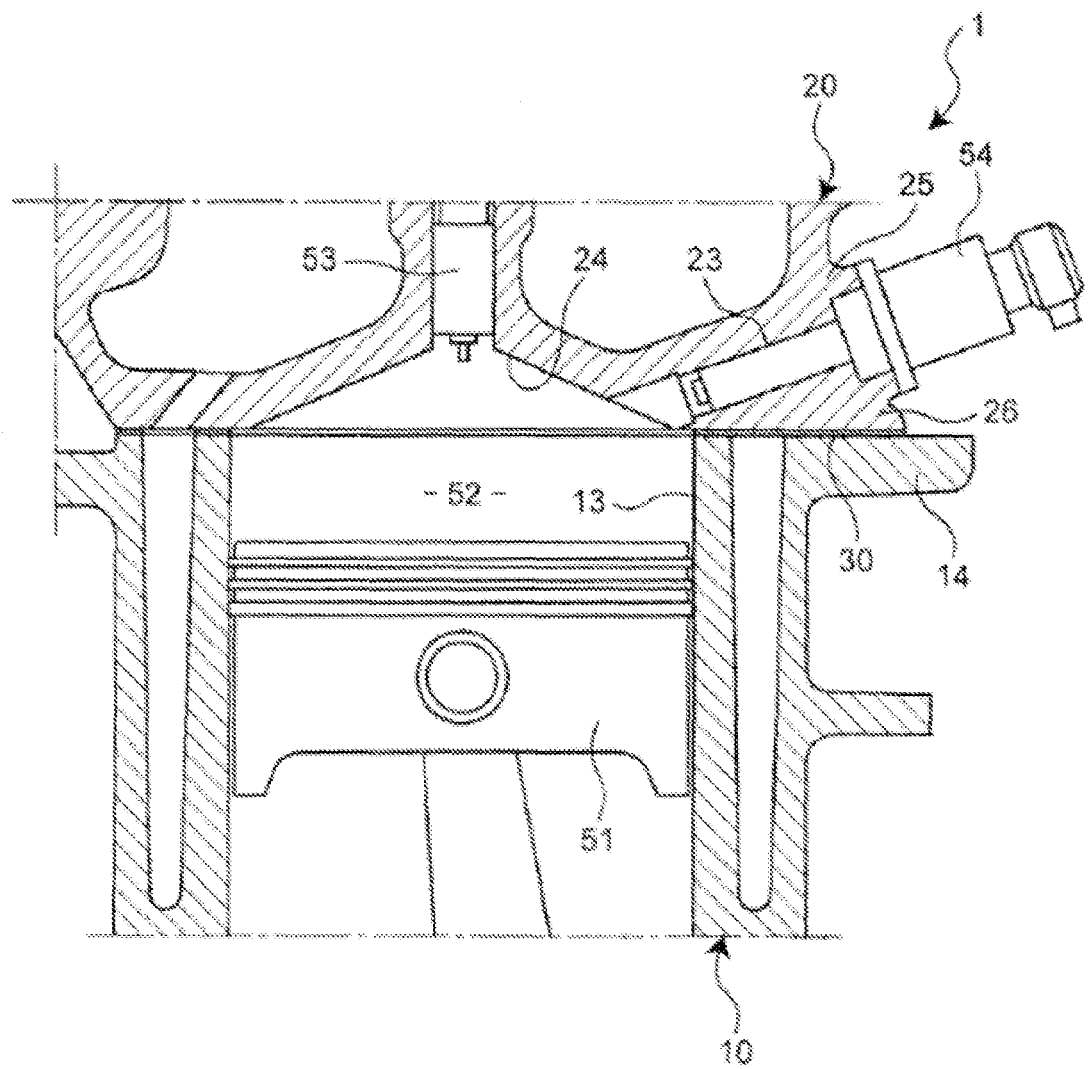
FIG. 3 is a cross-sectional view of a combustion chamber cut at a line X-X in FIG. 2.

Herein, as shown in FIG. 3, a cylinder bore 13 of the cylinder block 10, a piston 51 fitted in the bore 13, and a pentroof part 24 which is a lower surface of the cylinder head 20 constitute each of combustion chambers 52. A spark plug 53 is attached to the cylinder head 20 so as to point toward the center of the combustion chamber 52. A fuel injection valve 54 inserted in the mounting hole 23 in the side face of the cylinder head 20 faces the inside of the combustion chamber 52 from the side in order to directly inject fuel into the combustion chamber 52.

Figure 4:
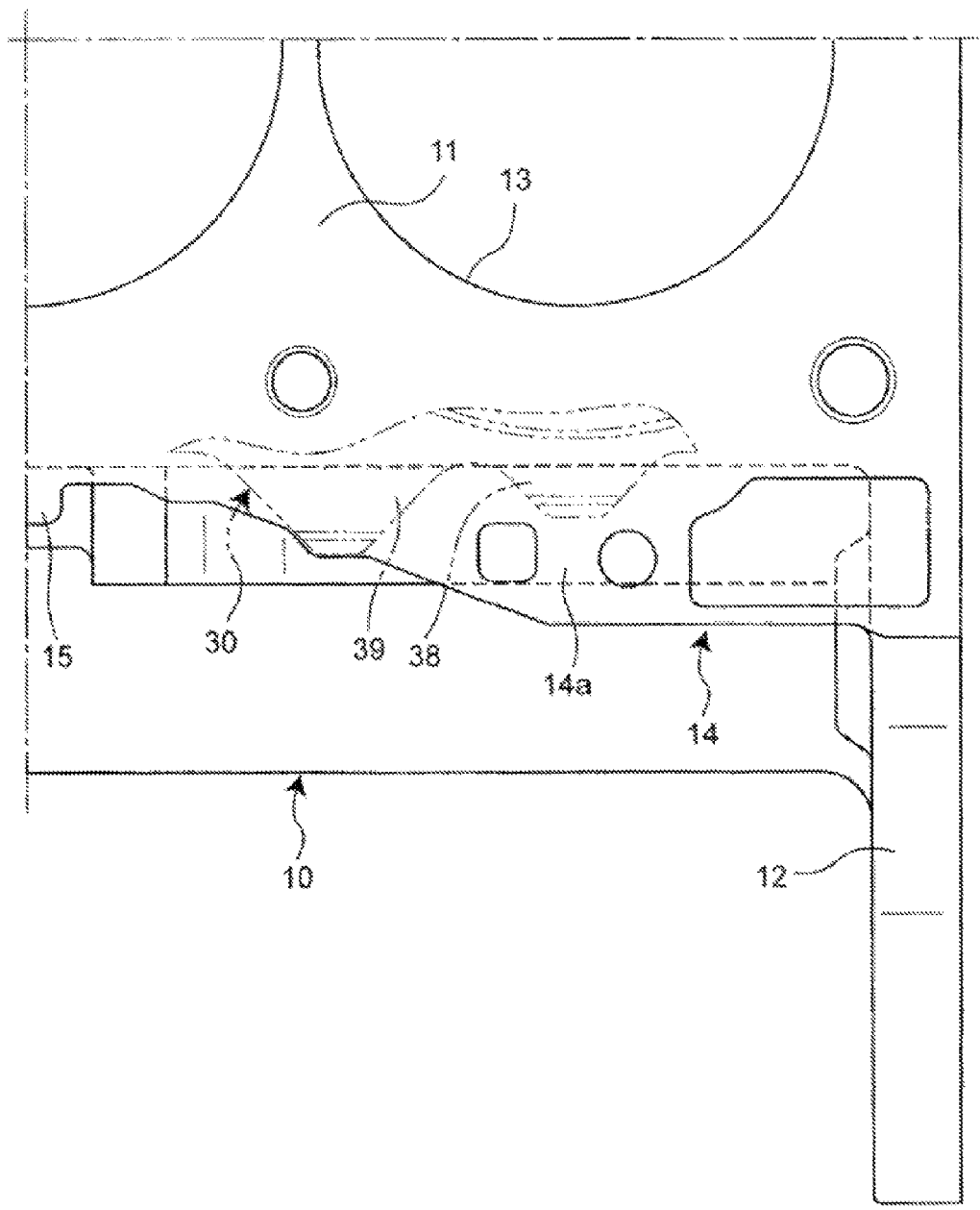
FIG. 4 is a plan view of a substantial part of a cylinder block.

As shown in FIGS. 2 and 4, in the side face of the rear part of the cylinder block 10, an overhang part 14 that extends forward from a back side part of the uppermost part of the flange portion 12 and overhangs to the side of the engine 1 is formed. The overhang part 14 serves as a reinforcing rib for reinforcing the uppermost part of the flange portion 12.

An upper surface 14a of the overhang part 14 forms the same surface with the coupling surface 11 (interposing surface of a gasket 30) of the cylinder block 10, coupled to the cylinder head 20. The overhang part 14 is formed in a shape having an overhanging amount so that the amount is substantially constant to the side within a predetermined range extending from the flange portion 12 to the front side, and gradually decreases forward from the range.

Forward of the overhang part 14 in the cylinder block 10, mass parts 15 are provided so that each is located immediately below the mounting hole 23 of the fuel injection valve in the cylinder head 20, extends downwardly from the coupling surface 11, and projects to the side of the engine 1 as well. Thereby, the vibration of side wall surfaces of the cylinder block 10 is suppressed.

Figure 5:
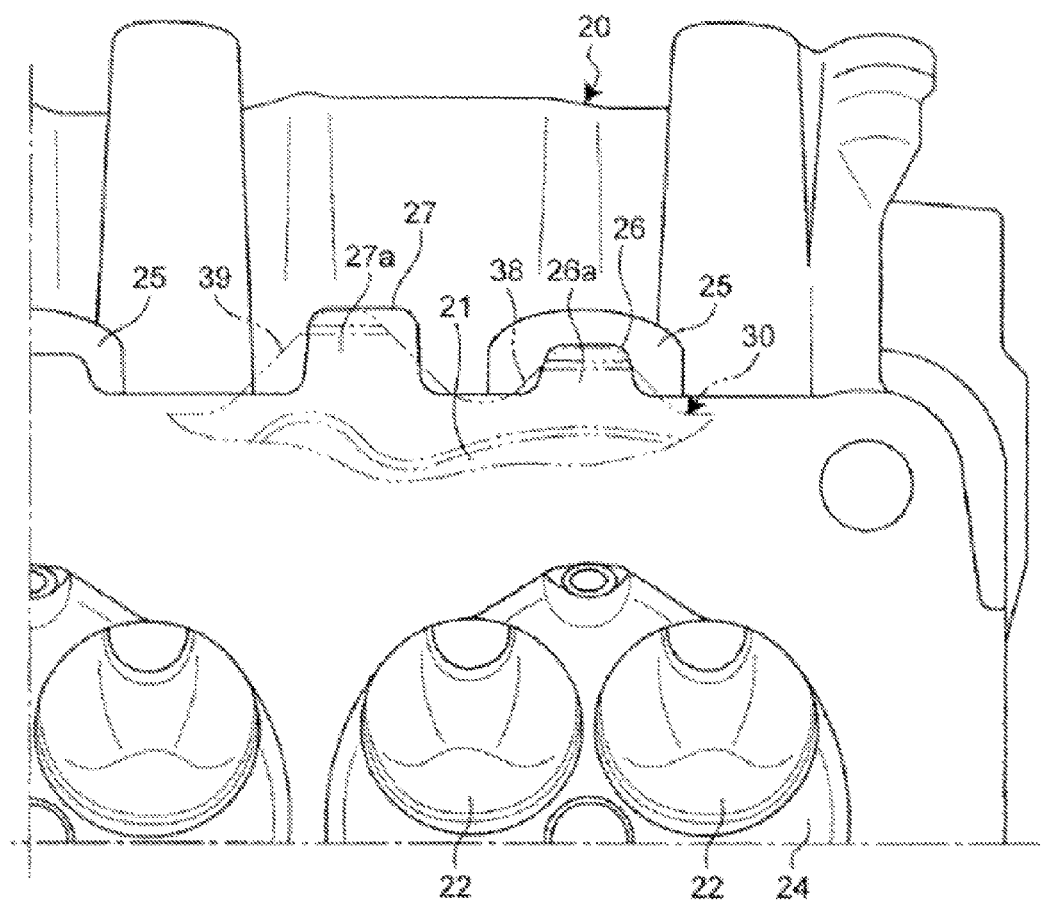
FIG. 5 is a bottom view of a substantial part of a cylinder head.

On the other hand, as shown in FIGS. 2 and 5, immediately below the mounting hole 23 for the fuel injection valve of the rearmost cylinder in the side face of the cylinder head 20, a first projecting part 26 is provided, which is formed by a thickened part constituting a lower part of a boss part 25 of the mounting hole 23, and overhangs to the side of the engine 1. The first projecting part 26 is located immediately above a substantial center part of the overhang part 14 in the front-and-rear direction in the cylinder block 10. A lower surface 26a of the first projecting part 26 forms the same surface with the coupling face 21 (interposing surface of the gasket 30) of the cylinder head 20.

In a part of the side face of the cylinder head 20, which is immediately above a front part of the overhang part 14 of the cylinder block 10, a second projecting part 27, of which a lower surface 27a forms the same surface with the coupling face 21 (interposing surface of the gasket 30) of the cylinder head 20, is provided to overhang to the side of the engine 1. Typically, the second projecting part 27 is provided at two or more locations around the cylinder head 20, and each is used as one of the processing reference portions when processing the cylinder head 20, assembling components to the cylinder head 20, etc.

Therefore, the upper surface 14a of the overhang part 14 in the cylinder block 10 which is made to form the same surface with the coupling faces 11 and 21 opposes the lower surfaces 26a and 27a of the first and second projecting parts 26 and 27 in the cylinder head 20.

Figure 6:
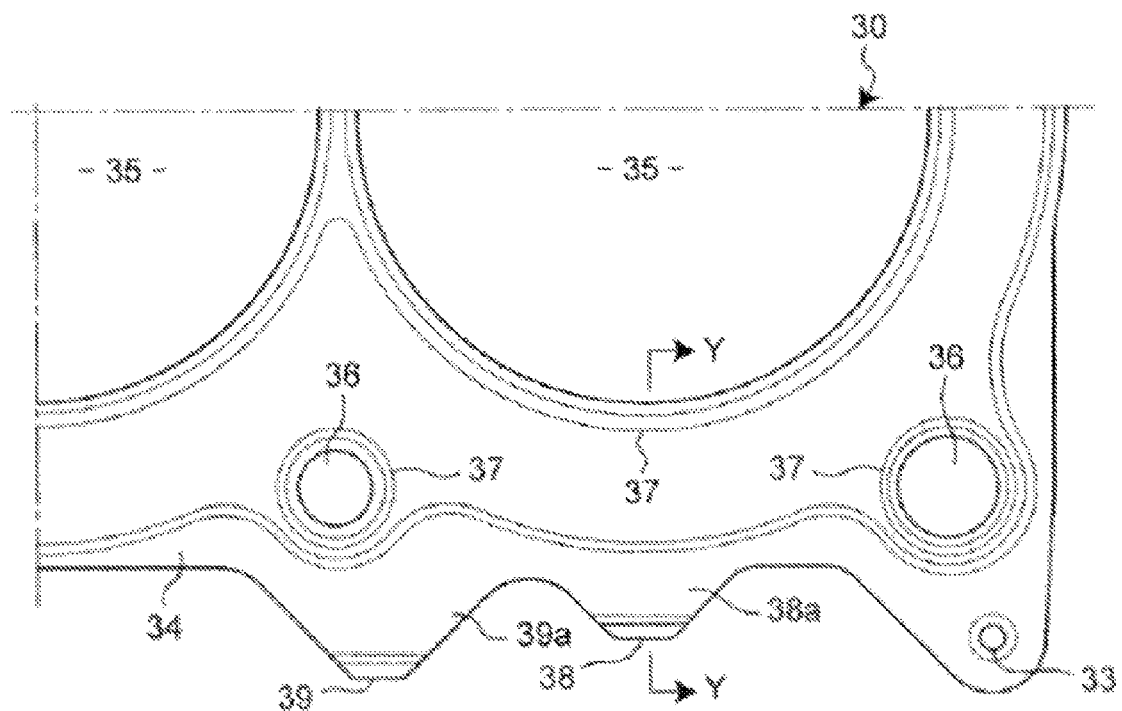
FIG. 6 is a plan view of a substantial part of a gasket.
Figure 7:
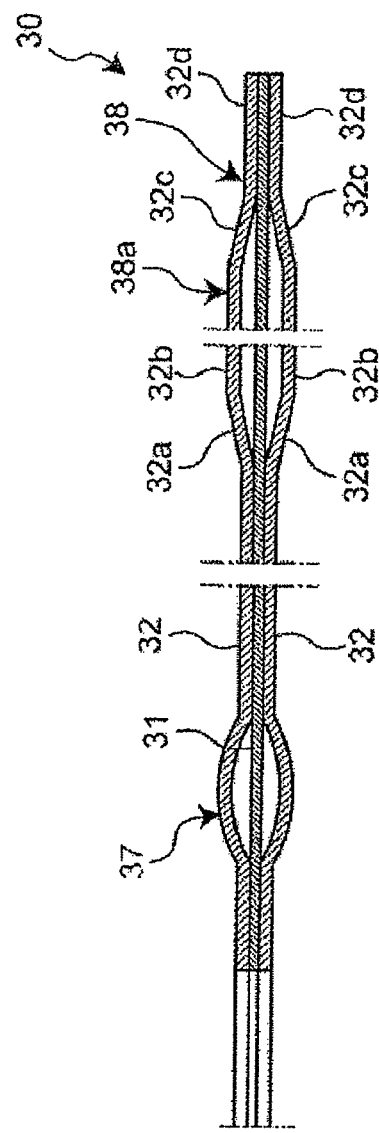
FIG. 7 is an enlarged cross-sectional view of a substantial part of the gasket cut at a line Y-Y in FIG. 6.

As shown in FIGS. 6 and 7, the gasket 30 is a sheet metal gasket, which is formed by laminating outer metal plates 32 on both sides of a center metal plate 31 and integrally coupling the plates by clamp parts 33 located at two or more locations. A body part 34 of the gasket 30 is made in a shape corresponding to the shapes of the coupling faces 11 and 21 between the cylinder block 10 and the cylinder head 20. The same number of circular holes 35 as the number of cylinders, which correspond to the bores 13 of the cylinder block 10 and two or more of insertion holes 36 of the head bolts, are formed in the body part 34.

Bead parts 37 formed by bulging the outer metal plates 32 are provided around the circular holes 35 and around the head bolt insertion holes 36. When coupling the cylinder block 10 and the cylinder head 20, the bead parts 37 are held down, thereby, its elastic repulsion force seals around the circular holes 35 and around the head bolt insertion holes 36 to prevent leakage of combustion gas from the combustion chambers 52, leakage of cooling water from water jackets, etc.

First and second extended piece parts 38 and 39 that project from the body part 34 are formed in the gasket 30. As shown by virtual lines in FIGS. 4 and 5, the extended piece parts 38 and 39 are provided at corresponding parts where the upper surface 14a of the overhang part 14 of the cylinder block 10 and the lower surfaces 26a and 27a of the first and second projecting parts 26 and 27 of the cylinder head 20 oppose to each other.

So-called "half-bead" shaped resilient portions 38a and 39a are formed in the extended piece parts 38 and 39, respectively. That is, as the first extended piece part 38 is shown enlarged in FIG. 7, the outer metal plates 32 are provided with first slope face parts 32a that incline in mutually separating directions from a state where they are in close contact with the center metal plate 31 toward a tip end side from a base part of the extended piece part 38; flat parts 32b that spread toward the tip end sides from the slope face parts 32a; second slope face parts 32c that incline in mutually approaching directions toward tip end sides of the flat parts 32b; and tip end parts 32d that again are in close contact with the center metal plate 31 at a further tip end side.

Thereby, the flat parts 32b of the outer metal plates 32 bulge to both sides, and the bulged parts serve as the resilient portions 38a and 39a that resiliently repel against pressurizing forces from both sides.

Next, an operation of this embodiment is described. The flange portion 12 reaching the coupling surface 11 which couples with the cylinder head 20 is formed in the rear end part of the cylinder block 10 of the engine 1. The flange portion 41 of the housing 40 accommodating the clutch or the torque converter on the transmission side is fastened to the flange portion 12 with bolts 42. Therefore, the cylinder block 10 of the engine 1 and the housing 40 are coupled by a large area, and a power unit which is constituted by the engine and the transmission obtains a high bending stiffness.

The overhang part 14 that extends to the front side from the back side part of the uppermost part of the flange portion 12 and overhangs to the side of the engine 1 is formed in the side face of the rear part of the cylinder block 10, and the overhang part 14 acts as the rib that reinforces the uppermost part of the flange portion 12. Therefore, the rigidity of the flange portion 12, and consequently, the coupling rigidity between the cylinder block 10 and the housing 40 of the transmission improve to further improve the bending stiffness of the power unit.

Further, to the upper surface 14a of the overhang part 14 of the cylinder block 10, the lower surfaces 26a and 27a of the first and second projecting parts 26 and 27 provided to the side face of the cylinder head 20 oppose. Between the opposing surfaces, the first and second extended piece parts 38 and 39 of the gasket 30 are located. When the cylinder block 10 and the cylinder head 20 are fastened interposing the gasket 30 therebetween, the first and second extended piece parts 38 and 39 of the gasket 30 are also inserted so as to be interposed between the upper surface 14a of the overhang part 14 and the lower surfaces 26a and 27a of the first and second projecting parts 26 and 27.

Meanwhile, the fuel injection valve 54 of the rearmost cylinder attached to the mounting hole 23 of the cylinder head 20 is located immediately above the overhang part 14. Ticking vibration caused by opening and closing the fuel injection valve 54 is transmitted to the overhang part 14 on the cylinder block 10 side from the boss part 25 of the fuel injection valve mounting hole 23. Thereby, the overhang part 14 will vibrate; however, by the above configuration, the transmission of the vibration can be suppressed.

Figure 8:
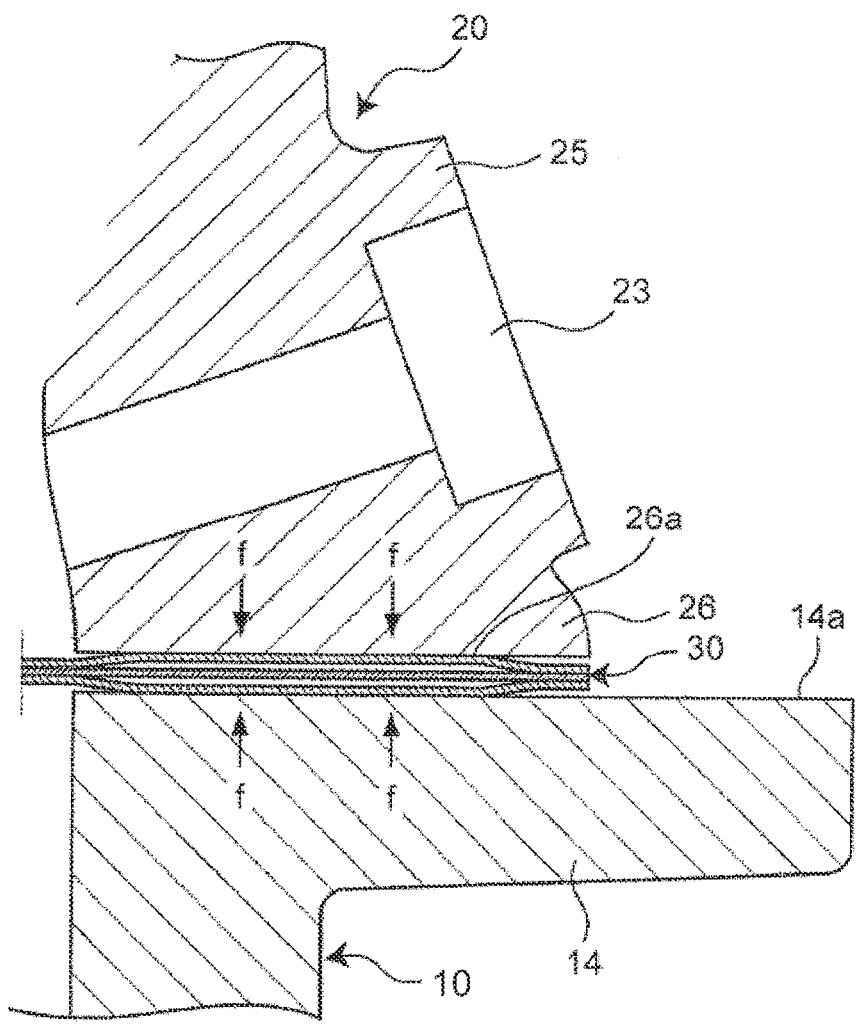
FIG. 8 is a diagram illustrating a pinching state of an extended piece part of the gasket.
Figure 9:
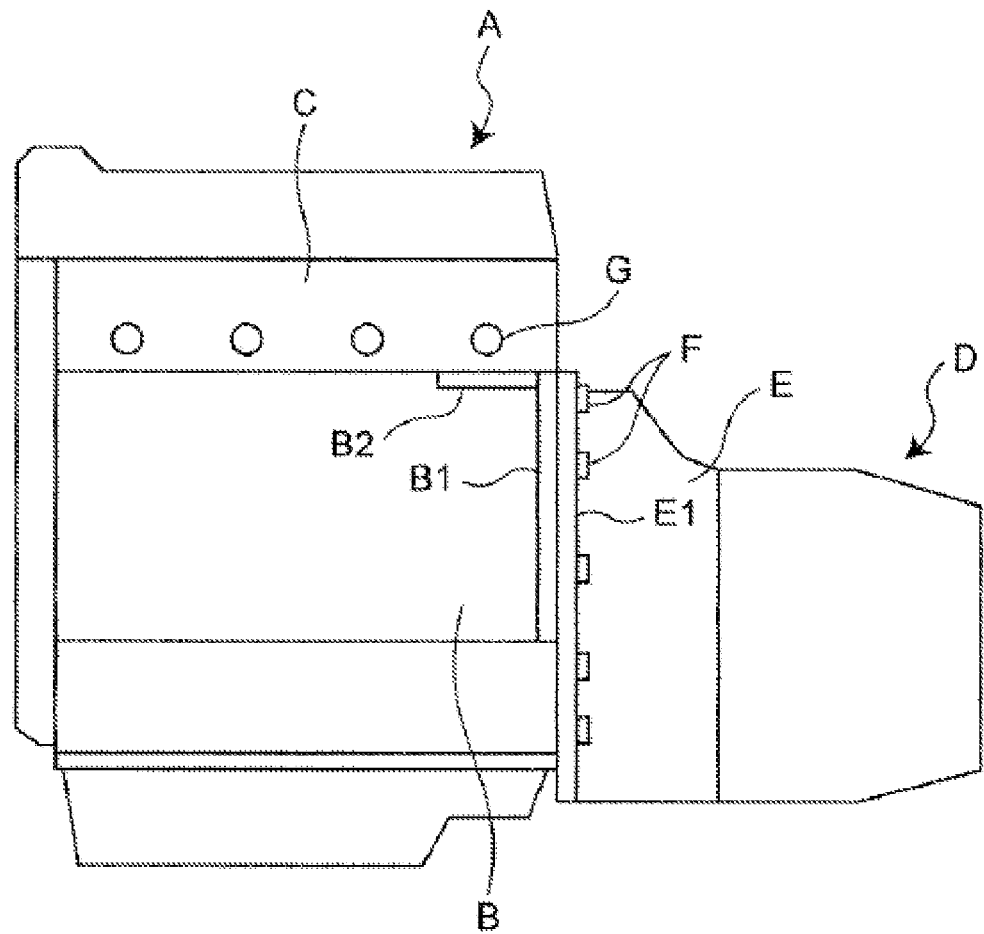
FIG. 9 is a diagram illustrating a related art.

That is, as described above, the first and second extended piece parts 38 and 39 of the gasket 30 are interposed between the upper surface 14a of the overhang part 14 of the cylinder block 10 and the lower surfaces 26a and 27a of the first and second projecting parts 26 and 27 of the cylinder head 20. Upon this, in the resilient portions 38a and 39a of the first and second extended piece parts 38 and 39, as a beginning state of the interposing is illustrated in FIG. 8 taking the first extended piece part 38 into consideration as an example, the flat parts 32b of the outer metal plates 32 bulging to both sides in a non-interposed state are pressed so as to closely contact the center metal plate 31 by a fastening force "f" between the cylinder block 10 and the cylinder head 20. As a result, the flat parts 32b are pressured to the upper surface 14a of the overhang part 14 and the lower surfaces 26a and 27a of the first and second projecting parts 26 and 27 by the elastic repulsion force.

Therefore, even if the ticking vibration due to the fuel injection valve 54 is transmitted to the first and second projecting parts 26 and 27 of the cylinder head 20, the resilient portions 38a and 39a of the first and second extended piece parts 38 and 39 in the gasket 30 absorb the vibration, and the transmission toward the overhang part 14 of the cylinder block 10 is suppressed. Thereby, the vibration of the overhang part 14 can be suppressed, membrane oscillation of the side wall surface of the cylinder block 10 can also be suppressed, and noises caused by vibration of the overhang part 14 itself, membrane oscillation of the cylinder block side wall surface and the like can be reduced.

In this case, the overhang part 14 of the cylinder block 10 is constituted by the rib that reinforces the uppermost part of the flange portion 12, and the first and second projecting parts 26 and 27 of the cylinder head 20 are constituted by the lower part and the processing reference portion of the boss part 25 of the fuel injection valve mounting hole 23, respectively. Therefore, in order to suppress the vibration and the noise, new ribs or new masses do not have to be formed in the cylinder block 10 and the cylinder head 20 and, thus, an increase in weight of the engine 1 caused by forming them can be avoided.

The resilient portions 38a and 39a in the extended piece parts 38 and 39 of the sheet metal gasket 30 are formed in the half-bead shape, and can be formed similar to the bead parts 37 for combustion chamber seals in this gasket 30 and for water jacket seals. Therefore, special processing for forming the resilient portions 38a and 39a is not needed, thereby a significant increase in the manufacture cost of the gasket 30 will not be caused.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An engine comprising:
   a cylinder block that is formed with a plurality of cylinder bores in a line that define a part of combustion chambers,
   a cylinder head mounted on a top surface of the cylinder block,
   a sheet metal gasket interposed between the cylinder block and the cylinder head,
   a first projection projecting outwardly and laterally from a side portion of the cylinder block, the first projection constituting an overhang part that serves as a reinforcing rib,
   a second projection projecting outwardly and laterally from a side portion of the cylinder head,
   the first projection and the second projection facing each other along a coupling surface between the cylinder block and the cylinder head, an extension extending from a main body of the sheet metal gasket and located between the first projection and the second projection, a resilient portion which is provided in the extension, formed resiliently in a direction perpendicular to the coupling surface, and compressed between the first projection and the second projection when the cylinder head is fastened on the cylinder block, a flange provided on a rear end surface of the cylinder block so as to reach the coupling surface between the cylinder block and the cylinder head, the flange portion configured to couple to a flange portion of a housing of a transmission, and the overhang part that serves as the reinforcing rib provided on a back portion of the coupling surface, extending forwardly from behind where an uppermost part of the flange portion provided on the rear end surface of the cylinder block connects to a top portion of the flange portion of the transmission housing, the reinforcing rib reinforcing the uppermost part of the flange portion provided on the rear end surface of the cylinder block.

2. The engine as defined in claim 1, further comprising:
a respective fuel injector provided on a side surface of each cylinder head to inject fuel directly into the corresponding combustion chamber.

3. The engine as defined in claim 2, wherein an attachment boss is provided on a rear side surface of the cylinder head for attaching the fuel injector that injects fuel into a rearmost combustion chamber, the reinforcing rib constitutes the first projection, and
a bottom portion of the attachment boss constitutes the second projection.

4. The engine as defined in claim 1, wherein a reference portion used in processing of the cylinder head is provided which laterally projects from a side of the engine, and
the reference portion constitutes the second projection.

5. The engine as defined in claim 2, wherein a reference portion used in processing of the cylinder head is provided which laterally projects from a side of the engine, and
the reference portion constitutes the second projection.

6. The engine as defined in claim 3, wherein a reference portion used in processing of the cylinder head is provided which laterally projects from a side of the engine, and
the reference portion constitutes the second projection.

7. The engine as defined in claim 1, wherein the resilient portion is a half-bead portion formed in the extension.

8. The engine as defined in claim 2, wherein the resilient portion is a half-bead portion formed in the extension.

9. The engine as defined in claim 3, wherein the resilient portion is a half-bead portion formed in the extension.

10. The engine as defined in claim 4, wherein the resilient portion is a half-bead portion formed in the extension.

11. The engine as defined in claim 5, wherein the resilient portion is a half-bead portion formed in the extension.

12. The engine as defined in claim 6, wherein the resilient portion is a half-bead portion formed in the extension.

\* \* \* \* \*